(12) United States Patent (10) Patent No.: US 10,757,632 B2
Ahmavaara (45) Date of Patent: Aug. 25, 2020

(54) PUBLIC LAND MOBILE NETWORK IDENTIFIER FOR NON-MOBILE NETWORK OPERATOR NETWORKS

(71) Applicant: QUALCOMM Incorporated, San Diego, CA (US)

(72) Inventor: Kalle Ilmari Ahmavaara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 14/485,465

(22) Filed: Sep. 12, 2014

(65) Prior Publication Data

US 2015/0092654 A1 Apr. 2, 2015

Related U.S. Application Data

(60) Provisional application No. 61/884,859, filed on Sep. 30, 2013.

(51) Int. Cl.
*H04W 48/10* (2009.01)
*H04W 48/16* (2009.01)
(Continued)

(52) U.S. Cl.
CPC ........... *H04W 48/10* (2013.01); *H04W 12/06* (2013.01); *H04W 48/16* (2013.01); *H04W 48/12* (2013.01); *H04W 48/18* (2013.01); *H04W 84/045* (2013.01)

(58) Field of Classification Search
CPC ..... H04W 48/10; H04W 48/16; H04W 12/06; H04W 48/12; H04W 48/18; H04W 84/045
See application file for complete search history.

(56) References Cited

U.S. PATENT DOCUMENTS 7,386,721 B1* 6/2008 Vilhuber ............. H04L 63/0442
709/220
8,238,909 B2 8/2012 Guo et al.
(Continued)

FOREIGN PATENT DOCUMENTS

CN 102217363 A 10/2011
WO 2009009364 A1 1/2009
(Continued)

OTHER PUBLICATIONS

International Search Report and Written Opinion—PCT/US2014/055706—ISA/EPO—Feb. 9, 2015.
(Continued)

*Primary Examiner* — Walter J Divito
*Assistant Examiner* — Anthony Luo
(74) *Attorney, Agent, or Firm* — Arent Fox LLP

(57) ABSTRACT

Described herein are techniques for identifying an access network in a wireless communication system. For example, the technique may involve determining a scheme for access network identification based on a public land mobile network-identifier (PLMN-ID) and an additional identifier. The technique may involve, receiving from the access network, broadcast information comprising the PLMN-ID and the additional identifier. The technique may involve determining that the access network belongs to a class of access networks that utilizes the additional identifier. The technique may involve identifying the access network using a combination of the PLMN-ID and additional identifier based on the class of access networks and the determined scheme.

29 Claims, 10 Drawing Sheets

(51) Int. Cl.
*H04W 12/06* (2009.01)
*H04W 48/18* (2009.01)
*H04W 48/12* (2009.01)
*H04W 84/04* (2009.01)

(56) References Cited

U.S. PATENT DOCUMENTS

| | | | |
|---|---|---|---|
| 8,457,599 B2 | 6/2013 | Ahmavaara | |
| 8,494,007 B2 | 7/2013 | Li et al. | |
| 8,855,636 B2 | 10/2014 | Ramachandran et al. | |
| 2007/0127408 A1* | 6/2007 | Sakamoto | H04L 12/2854 370/328 |
| 2008/0034057 A1* | 2/2008 | Kumar | H04L 12/4641 709/217 |
| 2010/0039991 A1* | 2/2010 | Godin | H04W 24/02 370/328 |
| 2010/0273468 A1* | 10/2010 | Bienas | H04W 24/02 455/418 |
| 2011/0136465 A1* | 6/2011 | Ekemark | H04W 4/22 455/404.1 |
| 2012/0023554 A1* | 1/2012 | Murgia | H04L 63/102 726/4 |
| 2012/0046034 A1* | 2/2012 | Lu | H04W 48/18 455/435.2 |
| 2012/0157095 A1* | 6/2012 | Fodor | H04W 4/08 455/434 |
| 2012/0196571 A1* | 8/2012 | Grkov | H04L 63/14 455/411 |
| 2012/0203909 A1* | 8/2012 | Kavanaugh | H04L 61/2517 709/226 |
| 2012/0236787 A1* | 9/2012 | Salkintzis | H04W 48/08 370/328 |
| 2013/0005391 A1* | 1/2013 | Niass | H04W 48/18 455/525 |
| 2013/0023267 A1* | 1/2013 | Ong | H04W 48/10 455/435.1 |
| 2013/0107757 A1 | 5/2013 | Cherian et al. | |
| 2013/0136089 A1* | 5/2013 | Gillett | H04W 72/048 370/329 |
| 2013/0217381 A1 | 8/2013 | Dhanda et al. | |
| 2013/0265961 A1* | 10/2013 | Van Phan | H04W 4/00 370/329 |
| 2013/0272305 A1* | 10/2013 | Lefebvre | H04L 47/24 370/392 |
| 2013/0273887 A1 | 10/2013 | Hole | |
| 2014/0098679 A1* | 4/2014 | Baillargeon | H04L 43/08 370/251 |
| 2014/0228031 A1* | 8/2014 | Masini | H04W 36/0083 455/436 |

FOREIGN PATENT DOCUMENTS

| | | |
|---|---|---|
| WO | 2010048435 A1 | 4/2010 |
| WO | 2013050435 A1 | 4/2013 |

OTHER PUBLICATIONS

Italia T., et al., "Pseudo-CR on Option C for CSG deployments", 3GPP DRAFT; 01-082792, (3GPP), vol. CT WG1, No. Zagreb, Croatia; Jun. 30, 2008, Jun. 30, 2008 (Jun. 30, 2008), XP050029985.
PSCR, "Public Safety 700 MHz Demonstration Network," Public Safety Communications Research, Network Identifier Guidelines, Version 1.1, Jan. 2012, 40 pages.
Vodafone, Qualcomm, Telecom Italia: "Definition of Variable length CSG id within the Cell Identity", 3GPP TSG-CT WG1#55 C1-083596, Aug. 22, 2008, pp. 1-5, Retrieved from the Internet, URL:http://www.3gpp.org/ftp/tsg_ct/WG1_mm-cc-sm_ex-CN1/TSGC1_55/Docs/C1-083596.zip . . . .

* cited by examiner

Residential Networks

Small Enterprise

Large Enterprise

Small ISP

Large ISP

PUBLIC LAND MOBILE NETWORK IDENTIFIER FOR NON-MOBILE NETWORK OPERATOR NETWORKS

CROSS-REFERENCE TO RELATED APPLICATION

The present application for patent claims priority to Provisional Application No. 61/884,859, filed Sep. 30, 2013, entitled "PLMN-ID FOR NON-MNO (NMO) NETWORKS" and which is assigned to the assignee hereof, and is hereby expressly incorporated in its entirety by reference herein.

BACKGROUND

Aspects of the present disclosure relate generally to wireless communication systems, and more particularly, to public land mobile networks.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of access point that can support communication for a number of mobile devices, such as, for example, mobile stations (STA), laptops, cell phones, PDAs, tablets, etc. A STA may communicate with an access point via the downlink (DL) and uplink (UL). The DL (or forward link) refers to the communication link from the access point to the STA, and the UL (or reverse link) refers to the communication link from the STA to the access point.

SUMMARY

Methods and apparatus for identifying an access network in a wireless communication are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method is provided for identifying an access network in a wireless communication system. The method includes determining a scheme for access network identification based on a public land mobile network-identifier (PLMN-ID) and an additional identifier. The method includes receiving, from the access network, broadcast information comprising the PLMN-ID and the additional identifier. The method includes determining that the access network belongs to a class of access networks that utilizes the additional identifier. The method includes identifying the access network using a combination of the PLMN-ID and additional identifier based on the class of access networks and the determined scheme.

In another aspect, an apparatus is provided for identifying an access network in a wireless communication system. The apparatus includes means for determining a scheme for access network identification based on a public land mobile network-identifier (PLMN-ID) and an additional identifier. The apparatus includes means for receiving, from the access network, broadcast information comprising the PLMN-ID and the additional identifier. The apparatus includes means for determining that the access network belongs to a class of access networks that utilizes the additional identifier. The apparatus includes means for identifying the access network using a combination of the PLMN-ID and additional identifier based on the class of access networks and the determined scheme.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
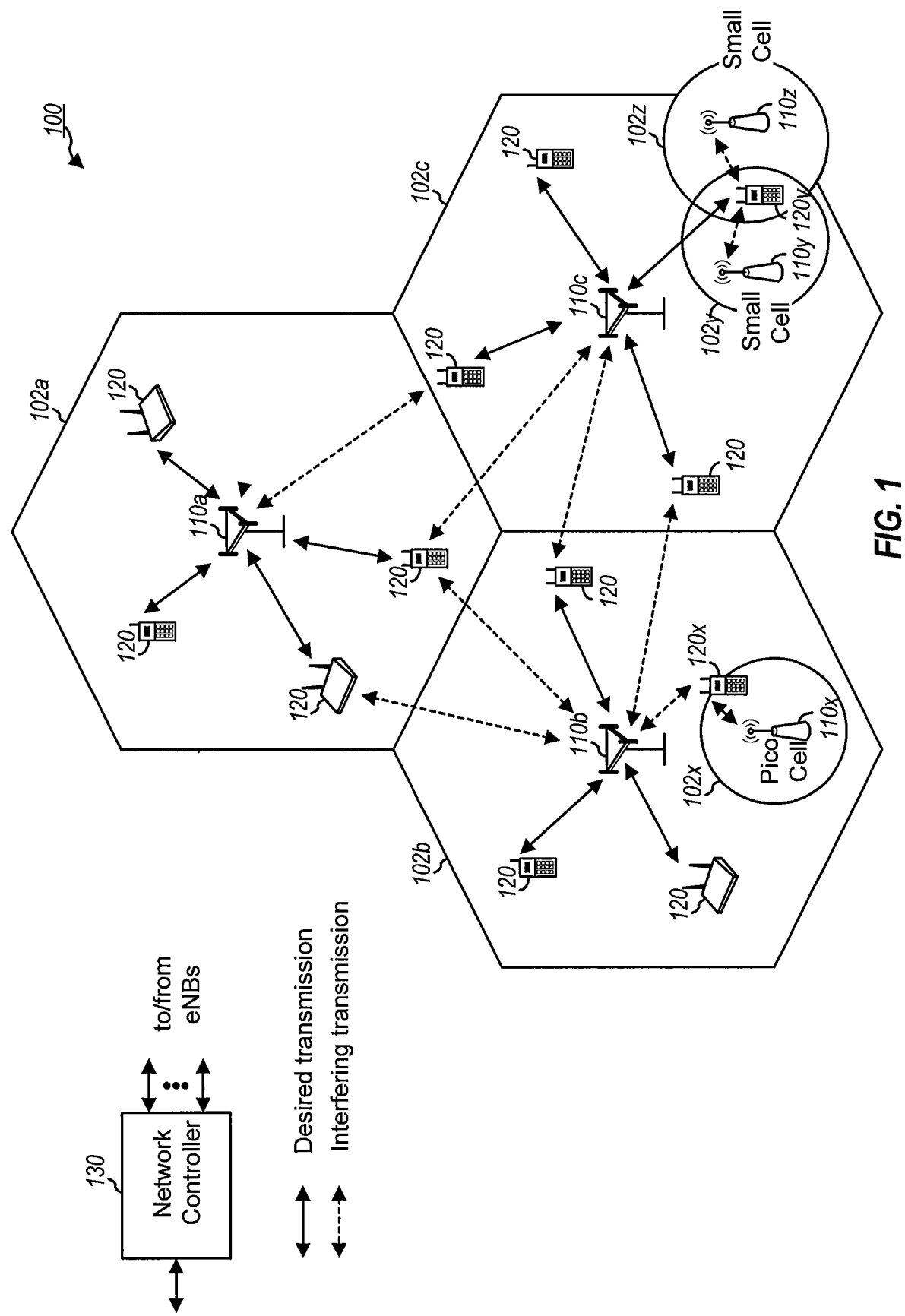
FIG. 1 is a block diagram conceptually illustrating an example of a telecommunications system.

Techniques for identifying an access network in a wireless communication system are described herein. In the techniques described herein, a PLMN-ID, which may not uniquely identify an access network, in combination with an additional identifier or an identifier suffix, may be needed to uniquely identify an access network. A method for uniquely identifying the access network may include determining a scheme for access network identification based on the PLMN-ID and the additional identifier. The method may determine that the access network belongs to a class of access networks that utilizes the additional identifier. The method may thus identify the access network using a combination of the PLMN-ID and additional identifier based on the class of access networks and the determined scheme.

In the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a small cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A small cell may cover a relatively small geographic area (e.g., a home) and may allow restricted access by UEs having association with the small cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a small cell may be referred to as a small cell eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be small cell eNBs for the small cells 102y and 102z, respectively. An eNB may support one or multiple (e.g., three) cells.

The wireless network 100 may be a heterogeneous network that includes eNBs of different types, e.g., macro eNBs, pico eNBs, small cell eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, small cell eNBs and relays may have a lower transmit power level (e.g., 1 Watt).

The wireless network 100 may support synchronous or asynchronous operation. Broadcast multicast operations may require synchronization of base stations within a defined area, but the present technology is not limited thereby. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile devices. A UE may be able to communicate with macro eNBs, pico eNBs, small cell eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
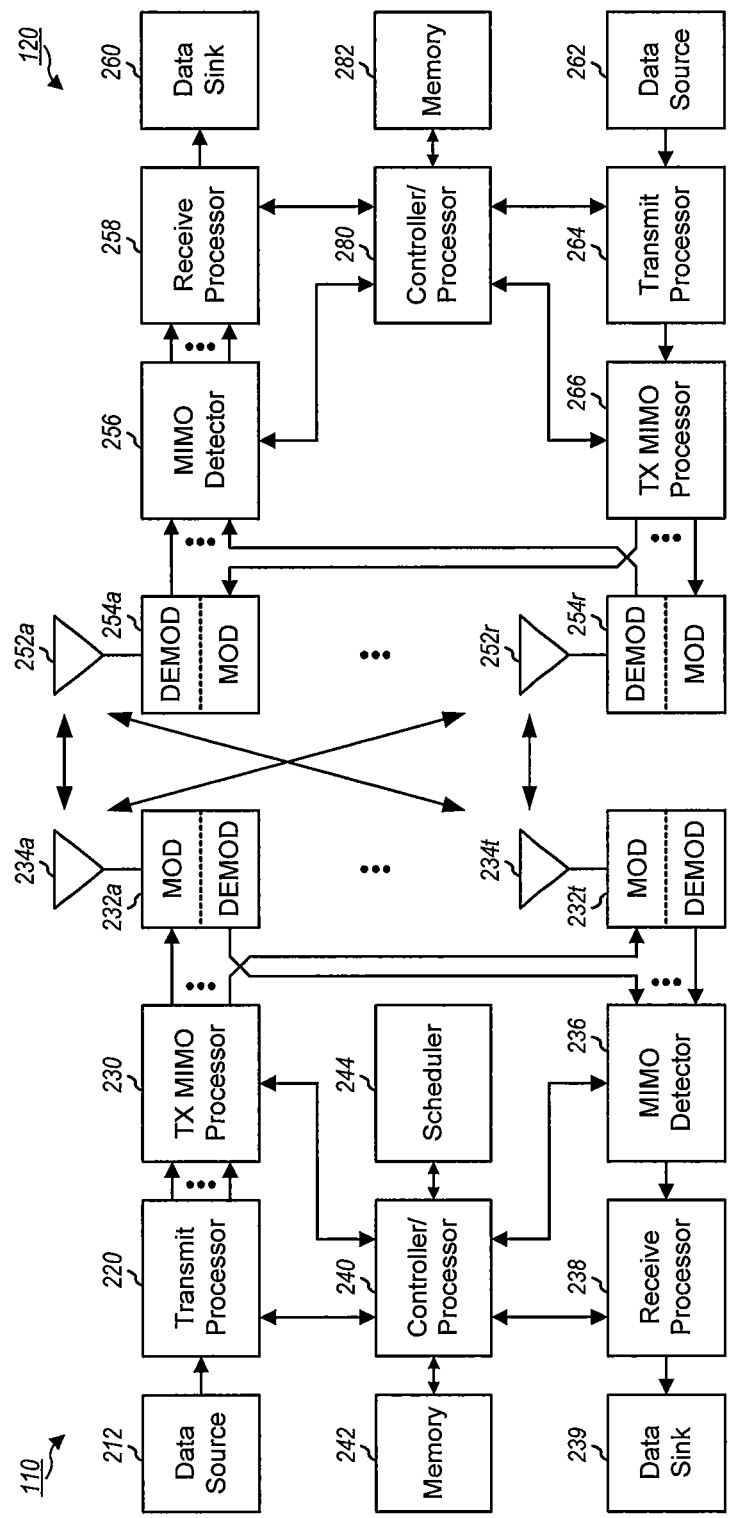
FIG. 2 is a block diagram conceptually illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The control information may be for the PBCH, PCFICH, PHICH, PDCCH, etc. The data may be for the PDSCH, etc. The processor 220 may process (e.g., encode and symbol map) the data and control information to obtain data symbols and control symbols, respectively. The processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 110. At the base station 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct the execution of various processes for the techniques described herein, such as the functional blocks illustrated in FIG. 7. The processor 280 and/or other processors and modules at the UE 120 may also perform or direct the execution of the functional blocks illustrated in FIG. 6, and/or other processes for the techniques described herein. The memories 242 and 282 may store data and program codes for the base station 110 and the UE 120, respectively. A scheduler 244 may schedule UEs for data transmission on the downlink and/or uplink.

Figure 8:
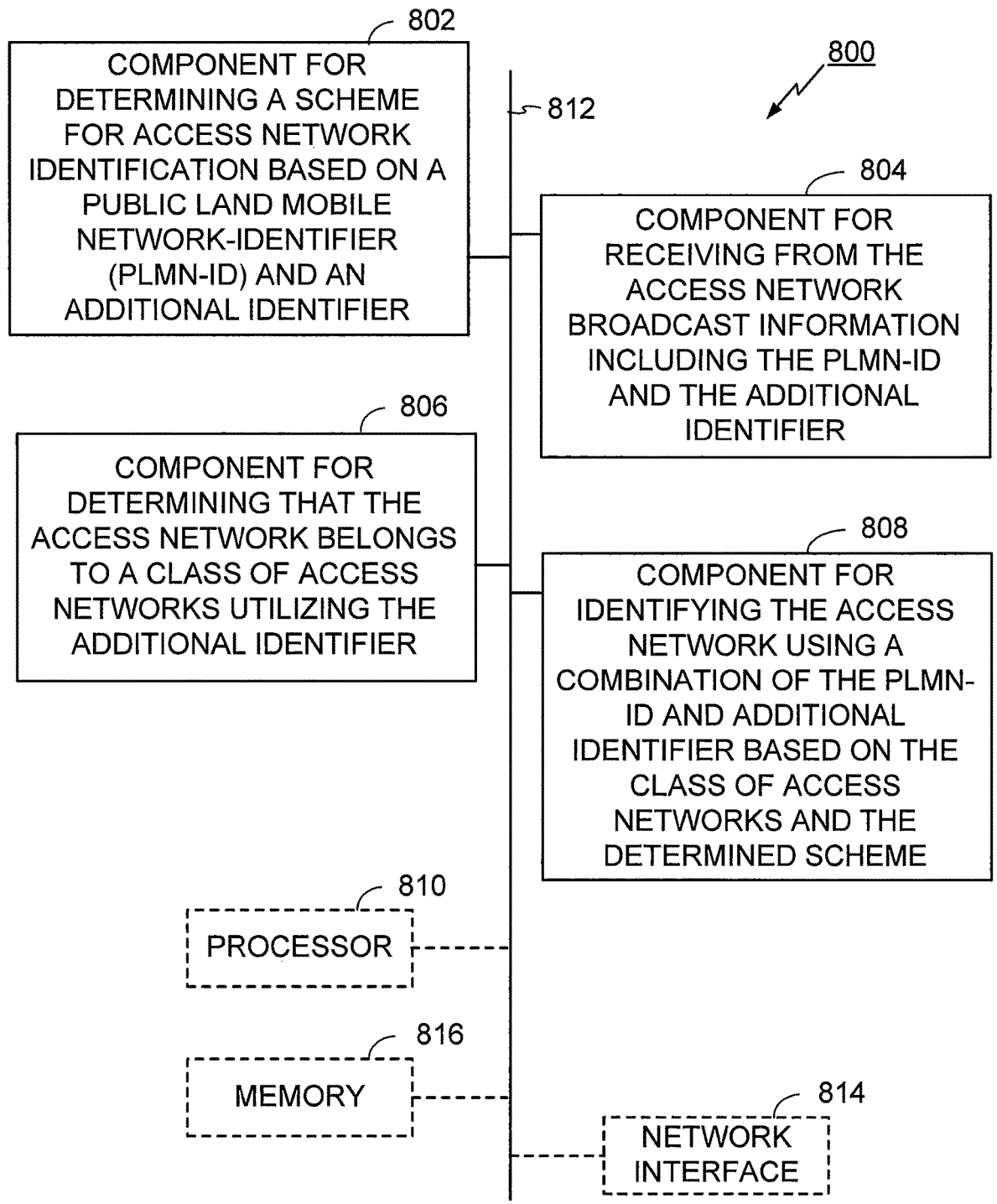
FIG. 8 illustrates an example apparatus for implementing the methodology of FIG. 6.

In one configuration, the UE 120 for wireless communication may include means for performing the process illustrated in FIG. 8. For example, the UE 120 may include means for determining a scheme for access network identification based on a public land mobile network-identifier (PLMN-ID) and an additional identifier. For example, the UE 120 may include means for receiving, from the access network, broadcast information comprising the PLMN-ID and the additional identifier. For example, the UE 120 may include means for determining that the access network belongs to a class of access networks that utilizes the additional identifier. For example, the UE 120 may include means for identifying the access network using a combination of the PLMN-ID and additional identifier based on the class of access networks and the determined scheme. In one aspect, the aforementioned means may be the processor(s), the controller/processor 280, the memory 282, the receive processor 258, the MIMO detector 256, the demodulators 254a, and the antennas 252a configured to perform the functions recited by the aforementioned means. In another aspect, the aforementioned means may be a module or any apparatus configured to perform the functions recited by the aforementioned means.

A mobile network operator (MNO) may be a provider of wireless services. Non-MNOs (NMO) networks may be deployed separate from the traditional MNO networks. NMOs may consist of mostly small cells such as femtocells, picocells, etc. An NMO network may be deployable by several types of entities such as consumers, enterprises, internet service providers (ISPs), MNOs, etc. In the various deployments, the NMO networks may support the various deployment sizes. For example, in a consumer deployment, only a single or few small cells may be deployed. In the enterprise deployment, the number may vary from a few to hundreds of small cells for larger organizations. ISPs and MNOs may deploy a larger number of cells spread across a larger geographic region. NMO deployment of small cells may provide benefits including better radio performance such as coverage and interference handling. NMO LTE deployment may provide ease of use, seamless mobility, security, interoperability and quality of service (QoS). These benefits may also be achieved by reusing established LTE system solutions for non-traditional LTE small cell deployments, such as reusing 3GPP architecture and E2E signaling (e.g., as specified in 3GPP TS 23.401).

In some cases, the NMO networks may provide data-only services similar to those provided by Wi-Fi networks. For example, the NMO networks may provide local network access, public or retail Internet access, or MNO offload. The NMO network may be based on LTE radio technology. The spectrum may be licensed or unlicensed. The NMO network may include devices with Wi-Fi and other radios to complement LTE.

Each MNO system may have its own public land mobile network (PLMN)-ID. In this case, the PLMN-ID may uniquely or unequivocally identify an access network.

The proliferation of LTE small cells, however, raises issues related to network identification and usage of cell IDs. The operation of an LTE network is based on a well-defined identification scheme assuming that the LTE network provider owns a dedicated PLMN-ID. As indicated above, a PLMN-ID uniquely identifies an access network such that each LTE network provider needs a dedicated PLMN-ID. While obtaining a dedicated PLMN-ID may not be difficult for a large network operator, the scheme may not be scalable for ISPs, enterprises, or consumers desiring to deploy LTE APs and networks. On the other hand, without a dedicated PLMN-ID, it may not be possible to reuse existing LTE identification and thus the idea of reusing existing LTE procedures (e.g., relating to mobility, security, etc.) may not be possible.

In one embodiment, a PLMN-ID may be reserved for NMO networks so that a dedicated PLMN-ID may not be required for each small cell deployment. In this case, the PLMN-ID may not uniquely identify an access network. An additional identifier or an identifier suffix, e.g., in combination with the PLMN-ID, may be needed to uniquely identify an access network. The range of the identifier suffix may determine the range and number of possible unique networks. The number of possible unique networks may be referred to as the PLMN-ID space. For example, a 28-bit identifier suffix allows identification of 268,435,456 unique entities—in this case the PLMN-ID space is 268,435,456.

Figure 3A:
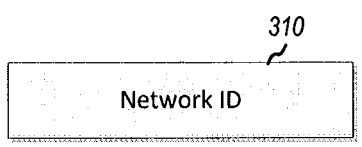
FIG. 3A illustrates an example PLMN-ID network identifier.
Figure 3B:
FIG. 3B illustrates an example network identifier including the PLMN-ID and an identifier suffix.

FIG. 3A illustrates a network identifier, e.g., PLMN-ID 310, that uniquely identifies an access network in a traditional deployment. FIG. 3B illustrates the combination of a network identifier, e.g., PLMN-ID 310, and additional identifier 320 that may uniquely identify an access network when a dedicated PLMN-ID 310 is reused by many NMOs. For example, the additional identifier 320 or identifier suffix may be broadcast, together with or separately from the PLMN-ID 310, to UEs to aid the UEs in identifying the access network. In one example, the network may be preconfigured to broadcast the additional identifier 320 including the additional network identification information to the UEs. The UEs may be preconfigured to understand the meaning of the additional network identification.

Each NMO network, as identified by the combination of the PLMN-ID 310 and additional identifier 320, may be run by a different provider, may have its own set of subscribers, and may have its own authentication system as well as its own services. UEs may have different credentials for each of these NMO networks. UEs may use the combination identifier for the following. First, the combination identifier may be used to understand to which network the UE may connect to (e.g., based on pre-configuration or network selection policy). Second, the combination identifier may be used to understand which credentials the UE may use for the connection establishment towards the selected NMO network. Third, the combination identifier may be used, once the UE is connected, to understand which additional cells belong to the already connected NMO network so that the UE and network may perform handovers and cell reselections appropriately.

A PLMN-ID allocation based on the additional identifier may provide a lower hurdle for deployment of new kinds of LTE networks because it may no longer be necessary to acquire a PLMN-ID to deploy a network. The PLMN-ID allocation may also enable proliferation of many smaller LTE networks. At the same time, the existing 3GPP identification system may be maintained within the new type of LTE networks. Procedures, including mobility and security procedures, used for LTE may be reused.

For example, a new national PLMN-ID may be reserved to be reused by multitude of NMO networks. Each service provider (e.g. NMO) may be allocated a portion of the PLMN-ID space to identify their cells. The additional network identifier (or network ID suffix of FIG. 3B) may take various forms.

In one aspect, a new field may be defined for conveying the information of the additional identifier. In another aspect, one or more existing fields may be used to provide the information of the additional identifier.

A number of possible existing fields may be repurposed to provide the information of the additional identifier instead of or in addition to their original purpose, such existing fields including a global cell ID (GCID), a PLMN-ID list, a closed subscriber group ID (CSG ID), etc. For example, the global cell IDs (GCIDs) may be used to identify MNO cells. The GCID may be globally unique. For example, the GCID may be a 28-bit ID providing for approximately 270 million globally unique GCIDs used to identify the MNO cells.

For identifying subscribers, the international mobile subscriber identifier (IMSI), may be used to identify the MNO subscribers. For example, the IMSI may be a 64-bit ID providing for approximately ten billion IDs that may be exchanged between a subscriber and the network for identifying the subscriber.

Table 1 below illustrates one example scheme for allocating an identifier to an NMO access network and for identifying the access network based on the identifier. For example, the scheme may be based on a PLMN-ID reserved for NMO networks. The PLMN-ID may be combined with an additional identifier to uniquely identify a particular network. The additional identifier may be partitioned based on Table 1 below. For example, the additional identifier may be based on or encapsulated in a GCID having 28 bits. The bit field of the GCID may be partitioned as illustrated in Table 1.

For example, five types of networks may include a residential type, enterprise/venue (small), enterprise/venue (large), ISP (small), and ISP (large). Each residential network may include a small number of cells. For example, a family may deploy two cells in a house, one cell for an upstairs floor another cell for a downstairs floor. The number of residential networks, however, may be substantial. In this case, it may be advantageous to allocate more of the bit space to distinguish between the residential networks, and to allocate a small number of IDs for identifying different cells within each residential network.

TABLE 1

Example bit partition for the PLMN-ID to identify networks and cells.

| Network Description | Network Type | Network ID | Cell ID | Maximum Number of Cells | Maximum Number of Networks |
|---|---|---|---|---|---|
| Residential | 3 bits | 23 bits | 2 bits | 4 | 8 M |
| Enterprise/Venue (small) | 3 bits | 17 bits | 8 bits | 256 | 131 k |
| Enterprise/Venue (large) | 3 bits | 13 bits | 12 bits | 4096 | 8 k |
| ISP (small) | 3 bits | 9 bits | 16 bits | 65 k | 512 |
| ISP (large) | 1 bit | 4 bits | 23 bits | 8 M | 16 |

As illustrate above in Table 1, each type of network may have different characteristics such that a variable bit range may be allocated for each portion (e.g., network type, network ID, and cell ID) of the additional identifier. The variable space allocation scheme may be communicated to the UE, or the UE may be preconfigured with the notion of the variable bit space allocation. For example, the UE may be preconfigured with the, e.g., five types of networks in Table 1.

In the example of an ISP (small), there may be a small number of ISP networks (on the order of hundreds) compared to the residential example, with a large number of cells (on the order of thousands) for each ISP. In this case, it may be beneficial to allocate more bits for identifying the cells with an ISP deployment. Table 1 provides example space allocation for each network type. One skilled in the art will recognize that other network types and bit space allocation may be possible.

Figure 3C:
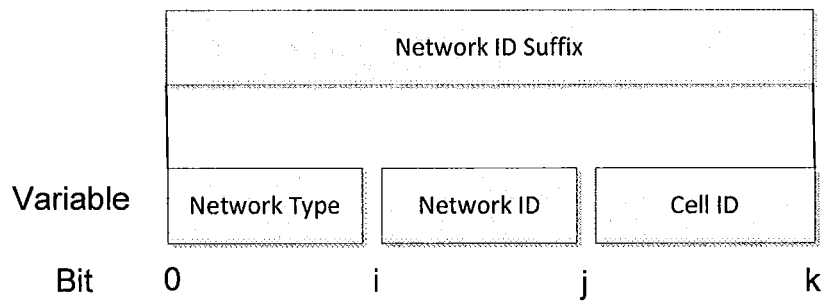
FIGS. 3C-H illustrate example identifier suffixes based on Table 1.

FIG. 3C illustrates the example partition of bits in the additional identifier based on Table 1. For example, the network ID suffix illustrated in FIG. 3B may be divided or partitioned into sub-identifiers. FIG. 3C illustrates the example partition based on a network type, network ID, and cell ID. The network type may occupy an allocation space having, e.g., a length of i bits. The network ID may occupy an allocation of bits having, e.g., a length of j bits. The cell ID may occupy an allocation of bits having, e.g., a length of k bits.

The bit length for each identifier may be allocated based on the network type. As discussed above, for smaller networks (e.g., residential), it may be beneficial to allocate more bit space for identifying each residential network and less bit space for identifying each cell within the residential network. For larger networks (e.g., small ISP), it may be beneficial to allocate more bit space for identifying each cell within the network and less space for identifying each ISP.

Figure 3D:
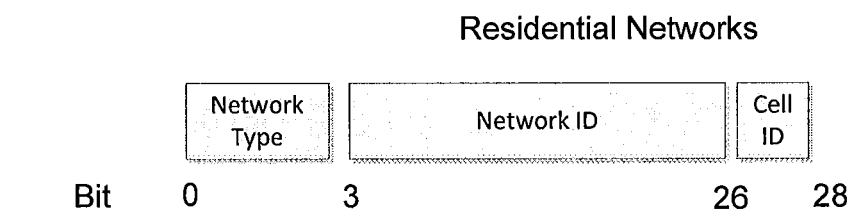

FIG. 3D illustrates an example bit space allocation for residential networks. For example, the network type may be 3 bits. For example, the network ID may be 13 bits, and the cell ID may be 2 bits. A total of 28 bits may identify (e.g., uniquely) a residential cell.

Figure 3E:
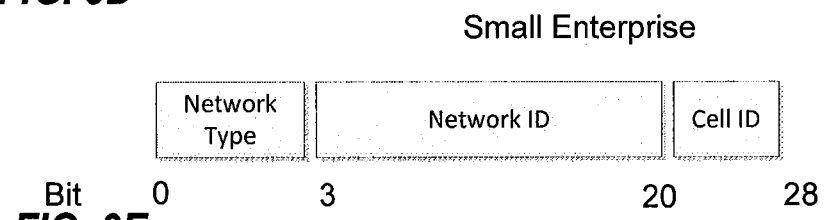

FIG. 3E illustrates an example bit space allocation for small enterprise networks. For example, the network type may be 3 bits. For example, the network ID may be 17 bits, and the cell ID may be 8 bits. A total of 28 bits may identify (e.g., uniquely) a small enterprise cell.

Figure 3F:
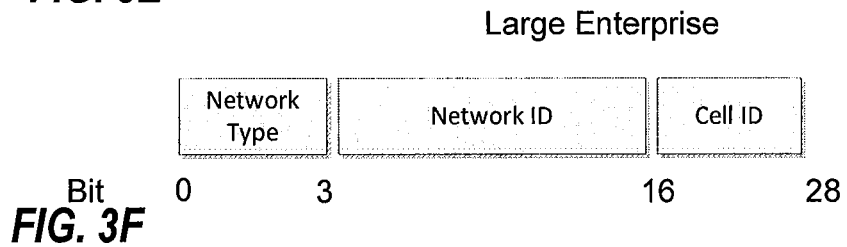

FIG. 3F illustrates an example bit space allocation for large enterprise networks. For example, the network type may be 3 bits. For example, the network ID may be 13 bits, and the cell ID may be 12 bits. A total of 28 bits may identify (e.g., uniquely) a large enterprise cell.

Figure 3G:
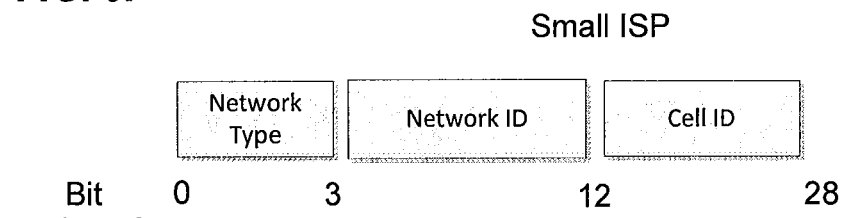

FIG. 3G illustrates an example bit space allocation for small ISP network. For example, the network type may be 3 bits. For example, the network ID may be 9 bits, and the cell ID may be 16 bits. A total of 28 bits may identify (e.g., uniquely) a small ISP cell.

Figure 3H:
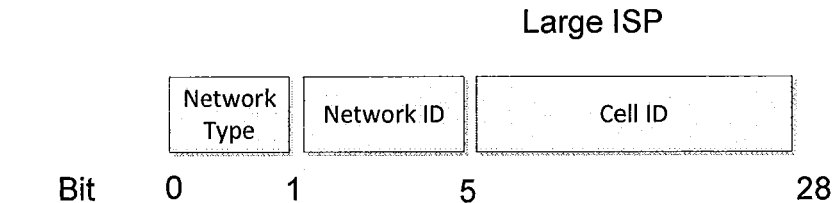

FIG. 3H illustrates an example bit space allocation for a large ISP network. For example, the network type may be 1 bit. For example, the network ID may be 4 bits, and the cell ID may be 23 bits. A total of 28 bits may identify (e.g., uniquely) a small ISP cell. In FIG. 3H, the network type may be one bit. In this case, a UE may read the first bit to determine whether the network belongs to a large ISP or another type. For example, a value of '0' may identify large ISPs. A UE reading a '0' may decode the next 4 bits as the network ID of the ISP. If the first bit is not a '0', then the UE may read the first three bits to decode the network type. One skilled in the art will readily recognize that other values, bit lengths, etc. may be possible for the space allocation.

It will be appreciated that the additional identifier or identifier suffix may take other forms. For example, the additional identifier may be based on a CSG-ID or any other suitable field. For example, the additional identifier may be partitioned based on a different bit allocation. The bit allocation for the network types may be static or dynamic. The partition and bit allocation may be preconfigured or communicated to the UEs.

As discussed above, a dedicated PLMN-ID may be reserved for shared NMO use, with the additional identifier in combination with the PLMN-ID uniquely identifying an access network. Normal national PLMN-ID allocation mechanisms may be used. For example, an NMO may apply for an allotment of identifiers (e.g., the combination of the PLMN-ID and additional identifier) through an existing organization tasked with assigning the identifiers. In another example, identifiers may be allocated by an NMO PLMN-ID administrator. The administrator may make the determination for how the PLMN-ID space may be allocated. For example, the administrator may use the PLMN-ID space allocation as illustrated in Table 1, or another allocation scheme. A NMO, e.g., a service provider, may request a portion of the PLMN-ID space from the administrator, and the administrator may allocate such portions of the PLMN-ID. Example NMO network providers may include network operators or service providers such as ISPs, enterprises, consumers. Example NMO network providers may include third party system or solution integrators. Example NMO network providers may include access point or eNB vendors (providing preconfigured turnkey APs).

In one aspect, security and authentication of networks and cells may be provided. When the PLMN-ID administrator allocates a network ID or a range of cell IDs to a particular provider, the provider may give "provider security information" to the administrator. This security information may be, e.g., the public key of the provider or the official name of the provider as certified for the provider by a certificate authority. The UE may detect availability of a specific network based on the broadcasted network ID. To verify that the cell is indeed operated by the assigned provider, there may be a means for the provider to send the "provider signature" to the UE over the provider network. The provider signature may be sent prior to the UE connecting to the network (by sending additional broadcast information) or may be sent after the UE has connected via the established connection between the UE and the network. The signature may be provided by new broadcast information (e.g., in a 3GPP RRC SIB), or a dedicated message from the network to UEs (e.g., RRC, NAS, or Application level signaling). The UE may be able to verify the validity of the received provider signature utilizing preconfigured information at the UE or based on interaction with a $3^{rd}$ party, such as a certificate authority.

Figure 4:
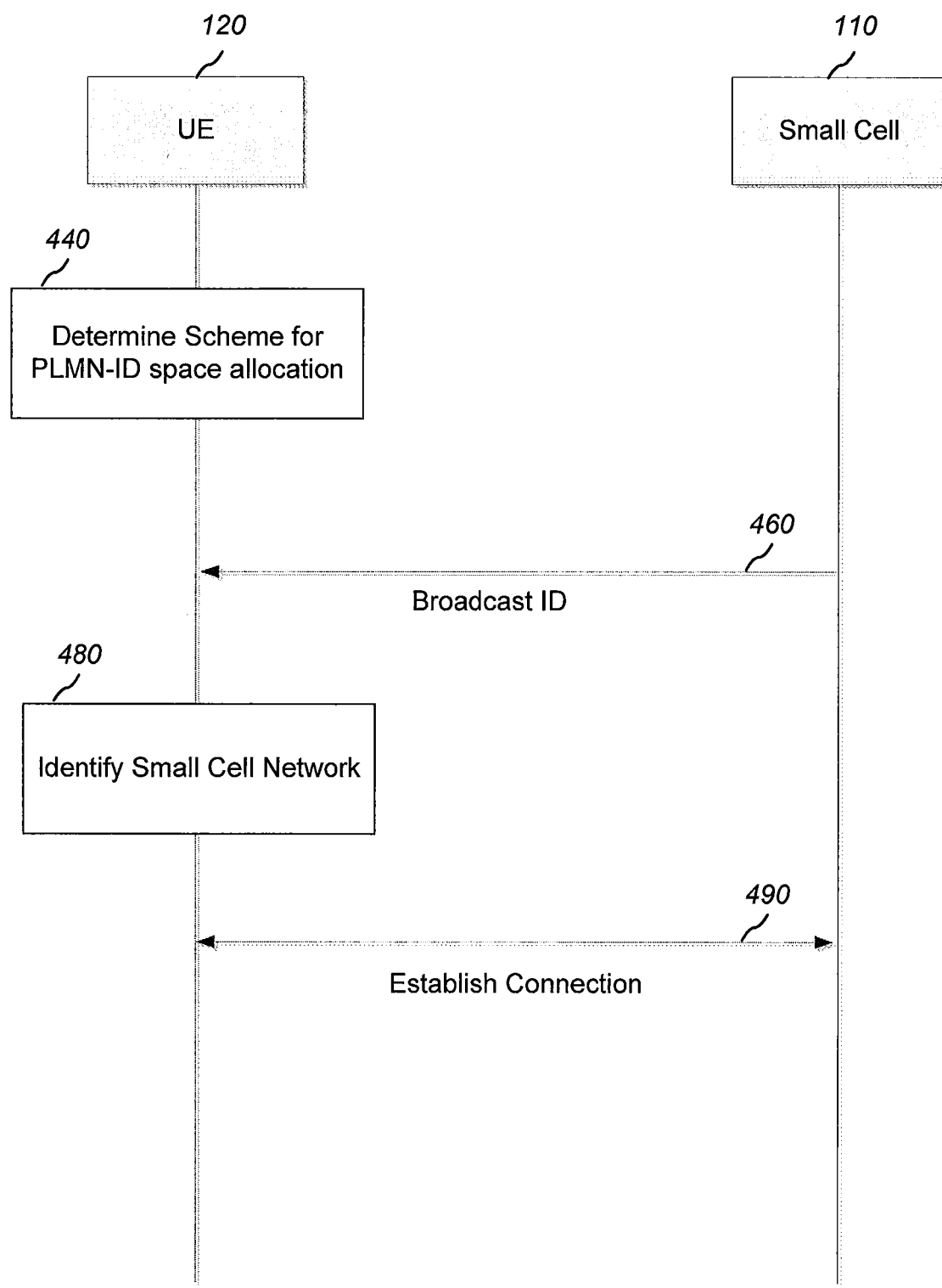
FIG. 4 illustrates an example call flow diagram for deployment of a small cell using the combination PLMN-ID and identifier suffix.

FIG. 4 illustrates an example call flow diagram for deployment of a small cell using the combination PLMN-ID and identifier suffix. The UE 120 may be configured with the notion of PLMN-ID reserved for NMOs. For example, the UE 120 may determine a scheme for PLMN-ID space allocation at step 440. In one example, the UE 120 may be preconfigured with the notion of the PLMN-ID space allocation, e.g., as illustrated in Table 1. In another example, the UE 120 may receive the information for the PLMN-ID space allocation scheme from the network. At step 460, the small cell 110 (e.g., a NMO small cell) may broadcast its ID. At step 480, the UE 120 may determine the identifier of the small cell 110 based on the determined scheme. At step 490, the UE may establish a connection with the small cell 110.

Figure 5:
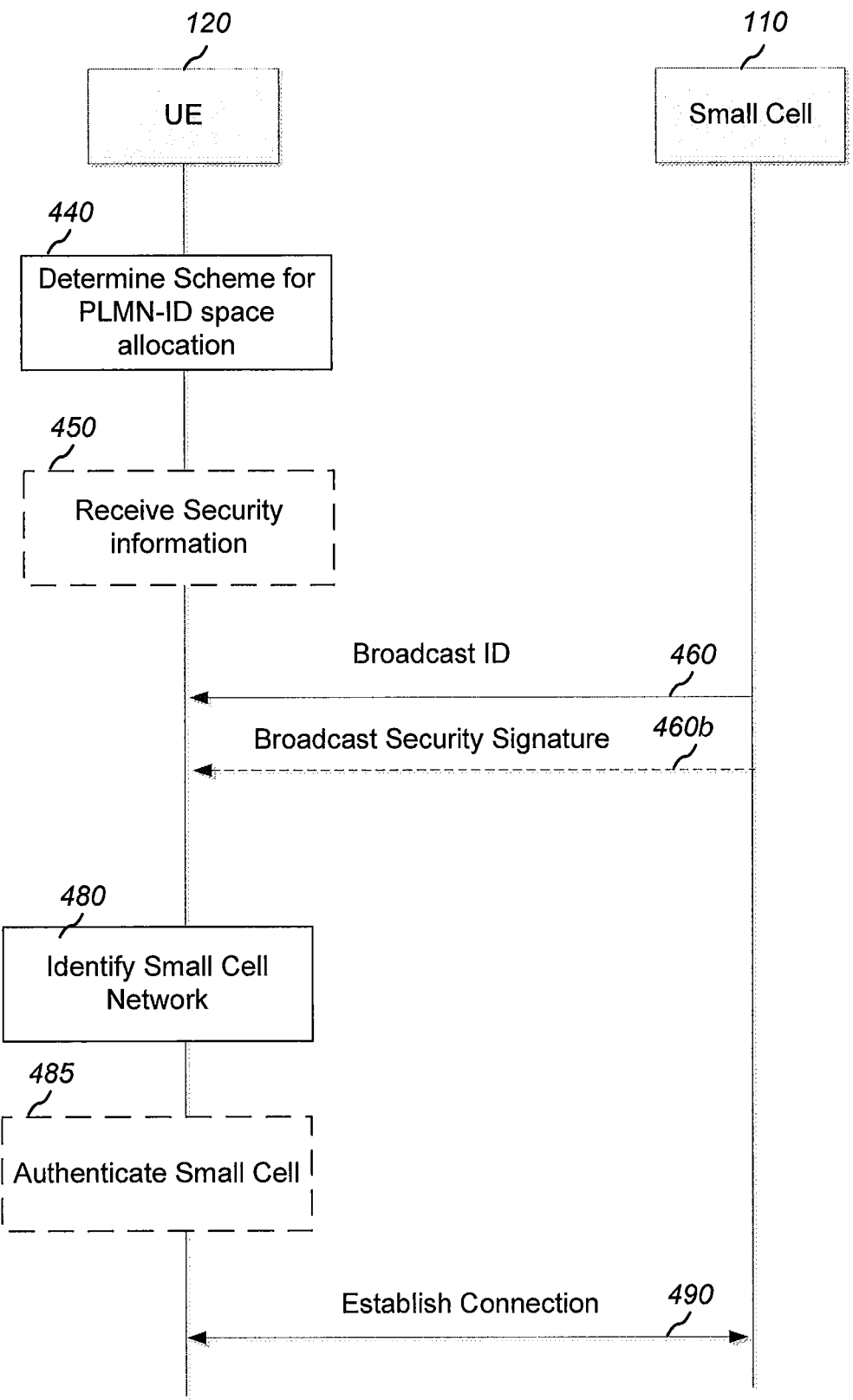
FIG. 5 illustrates an example call flow diagram for deployment of a small cell including authentication of the small cell.

FIG. 5 illustrates an example call flow diagram for deployment of a small cell including authentication of the small cell. The UE 120 may be configured with the notion of PLMN-ID reserved for NMOs. For example, the UE 120 may determine a scheme for PLMN-ID space allocation at step 440. In one example, the UE 120 may be preconfigured with the notion of the PLMN-ID space allocation, e.g., as illustrated in Table 1. In another example, the UE 120 may receive the information for the PLMN-ID space allocation scheme from the network. At step 450, the UE 120 may receive security information related to one or more cells. At step 460, the small cell 110 (e.g., a NMO small cell) may broadcast its ID. At step 460b, the small cell 110 (e.g., a NMO small cell) may broadcast its security signature. At step 480, the UE 120 may determine the identifier of the small cell 110 based on the determined scheme. At step 485, the UE 120 may authenticate the small cell 110 based on the security information and security signature. At step 490, the UE may establish a connection with the small cell 110. Steps 450, 460b, and 485 may be performed in another order. For example, the small cell may send the security signature (step 460b) after the UE has established a connection with the network. For example, the UE may authenticate the small cell 110 after establishing the connection.

Figure 6:
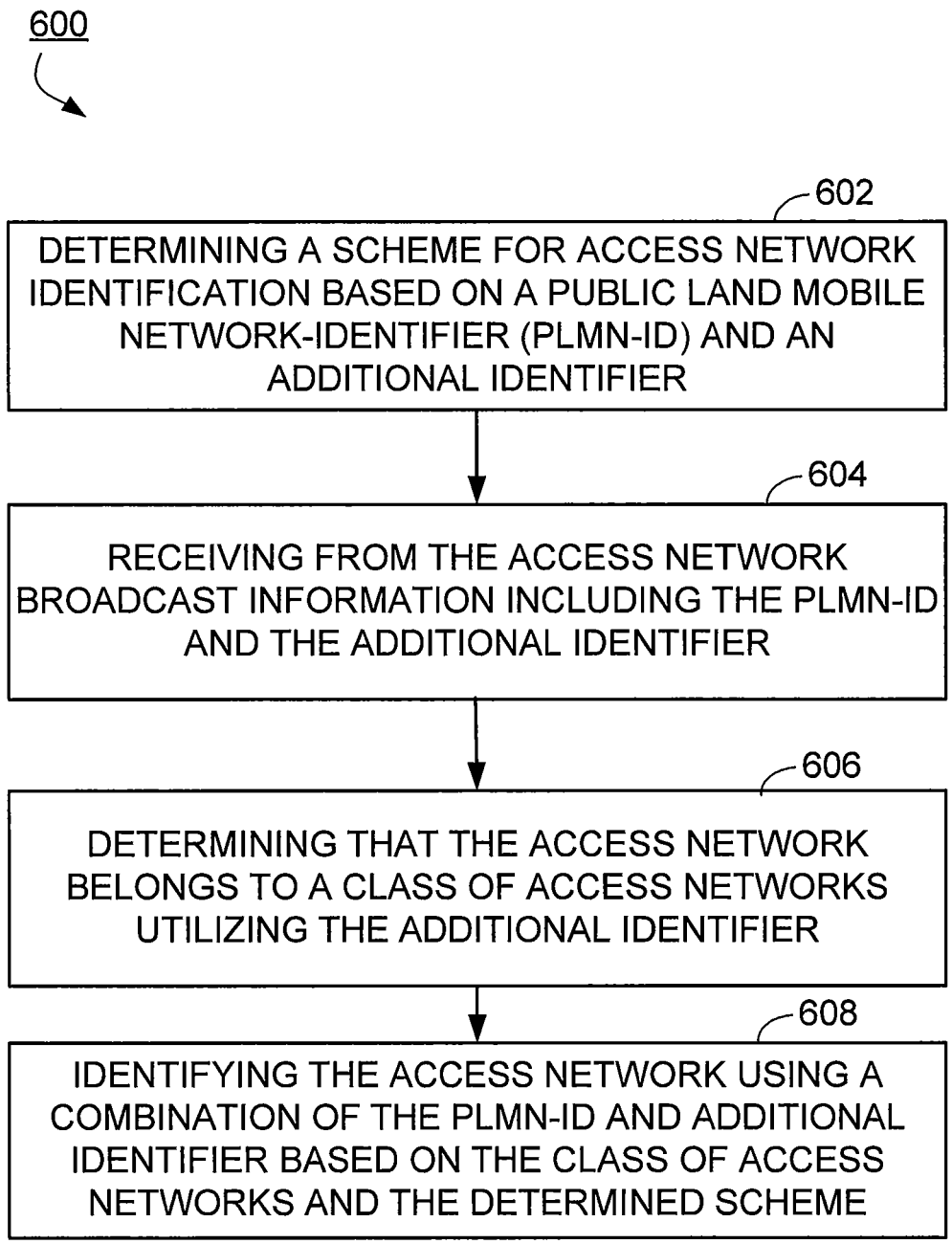
FIG. 6 illustrates embodiments of methodologies for identifying an access network.

FIG. 6 illustrates embodiments of methodologies for identifying an access network. The method may be performed by a UE, mobile entity, or the like. The method 600 may include, at 602, determining a scheme for access network identification based on a PLMN-ID and an additional identifier. The method 600 may include receiving, from the access network, broadcast information comprising the PLMN-ID and the additional identifier, at 604. The method 600 may include determining that the access network belongs to a class of access networks that utilizes the additional identifier, at 606. The method 600 may include identifying the access network using a combination of the PLMN-ID and additional identifier based on the class of access networks and the determined scheme, at 608.

Figure 7:
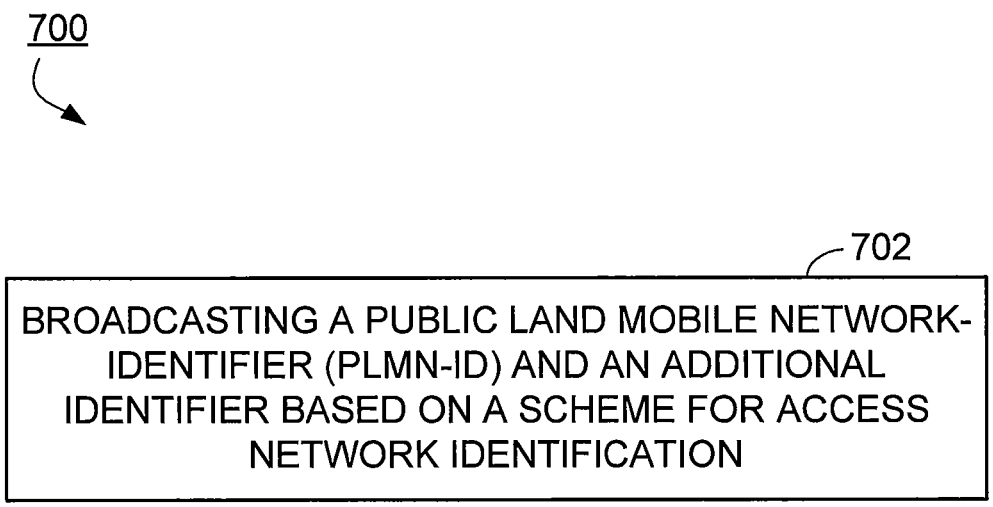
FIG. 7 illustrates further embodiments of methodologies for identifying an access network.

FIG. 7 illustrates embodiments of methodologies for identifying an access network. The method may be performed by an access point, eNB, or the like. The method 700 may include, at 702, broadcasting a PLMN-ID and an additional identifier based on a scheme for access network identification.

With reference to FIG. 8, there is provided an exemplary apparatus 800 that may be configured as a UE, network entity, or other suitable entity, or as a processor, component or similar device for use within the UE, network entity, or other suitable entity, for network node selection. The apparatus 800 may include functional blocks that can represent functions implemented by a processor, software, or combination thereof (e.g., firmware).

As illustrated, in one embodiment, the apparatus 800 may include an electrical component or module 802 for determining a scheme for access network identification based on a PLMN-ID and an additional identifier. The apparatus 800 may include an electrical component or module 804 for receiving, from the access network, broadcast information comprising the PLMN-ID and the additional identifier. The apparatus 800 may include an electrical component or module 806 for determining that the access network belongs to a class of access networks that utilizes the additional identifier. The apparatus 800 may include an electrical component or module 808 for identifying the access network using a combination of the PLMN-ID and additional identifier based on the class of access networks and the determined scheme.

In related aspects, the apparatus 800 may optionally include a processor component 810 having at least one processor, in the case of the apparatus 800 configured as a network entity. The processor 810, in such case, may be in operative communication with the components 802-808 or similar components via a bus 812 or similar communication coupling. The processor 810 may effect initiation and scheduling of the processes or functions performed by electrical components or modules 802-808.

In further related aspects, the apparatus 800 may include a network interface component 814 for communicating with other network entities. The apparatus 800 may optionally include a component for storing information, such as, for example, a memory device/component 816. The computer readable medium or the memory component 816 may be operatively coupled to the other components of the apparatus 800 via the bus 812 or the like. The memory component 816 may be adapted to store computer readable instructions and data for performing the activity of the components 802-808, and subcomponents thereof, or the processor 810. The memory component 816 may retain instructions for executing functions associated with the components 802-808. While shown as being external to the memory 816, it is to be understood that the components 802-808 can exist within the memory 816.

Figure 9:
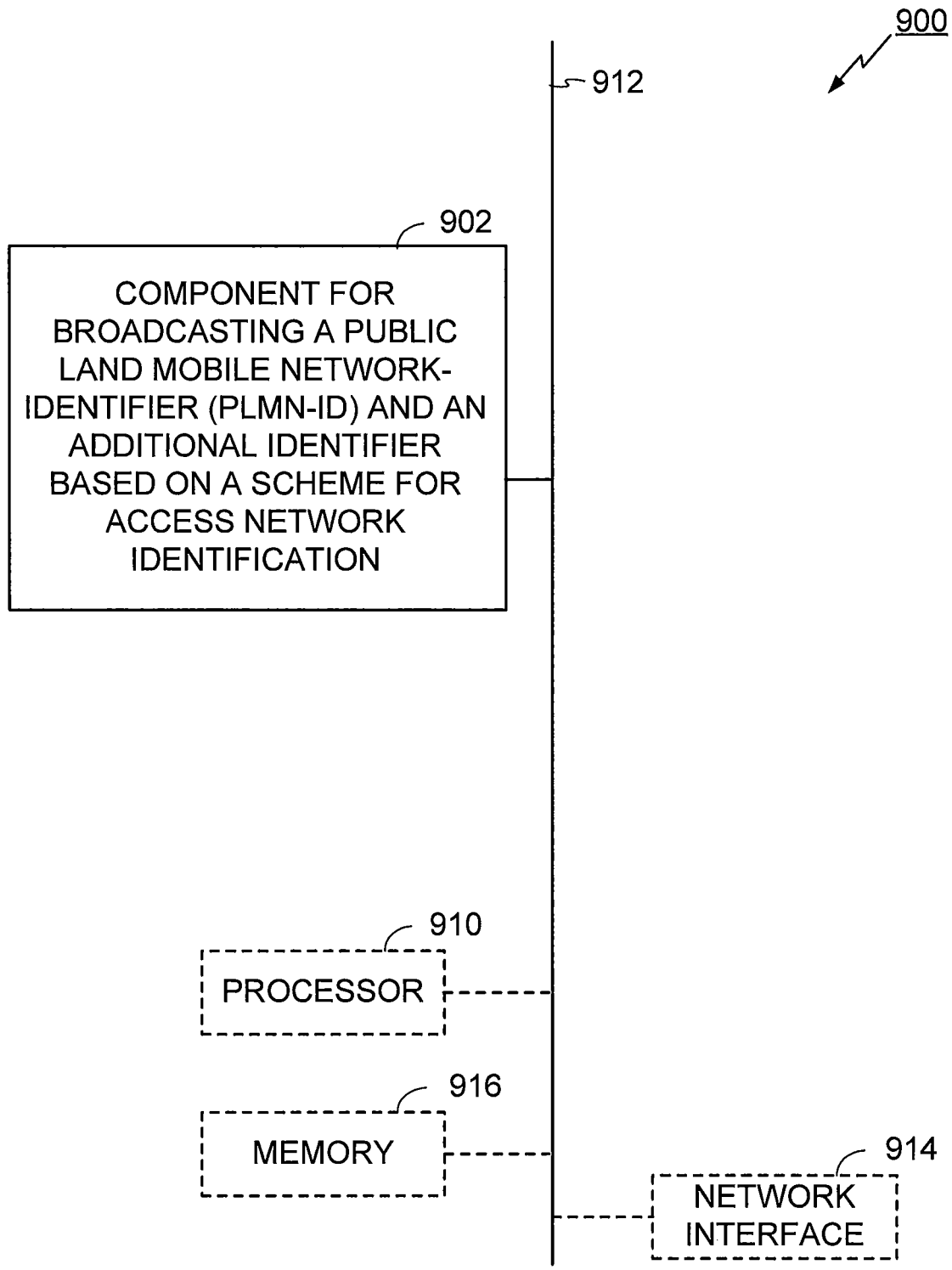
FIG. 9 illustrates an example apparatus for implementing the methodology of FIG. 7.

With reference to FIG. 9, there is provided an exemplary apparatus 900 that may be configured as an access point, network entity, or other suitable entity, or as a processor, component or similar device for use within the access point, network entity, or other suitable entity. The apparatus 900 may include functional blocks that can represent functions implemented by a processor, software, or combination thereof (e.g., firmware).

As illustrated, in one embodiment, the apparatus 900 may include an electrical component or module 902 for broadcasting a PLMN-ID and an additional identifier based on a scheme for access network identification. The additional identifier may be configured for identifying the access network based on a classification of the access network and the scheme.

In related aspects, the apparatus 900 may optionally include a processor component 910 having at least one processor, in the case of the apparatus 900 configured as a network entity. The processor 910, in such case, may be in operative communication with the components 902 or similar components via a bus 912 or similar communication coupling. The processor 910 may effect initiation and scheduling of the processes or functions performed by electrical components or modules 902.

In further related aspects, the apparatus 900 may include a network interface component 914 for communicating with other network entities. The apparatus 900 may optionally include a component for storing information, such as, for example, a memory device/component 916. The computer readable medium or the memory component 916 may be operatively coupled to the other components of the apparatus 900 via the bus 912 or the like. The memory component 916 may be adapted to store computer readable instructions and data for performing the activity of the components 902, and subcomponents thereof, or the processor 910. The memory component 916 may retain instructions for executing functions associated with the components 902. While shown as being external to the memory 916, it is to be understood that the components 902 can exist within the memory 916.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for identifying an access network in a wireless communication system, the method comprising:
receiving, from the access network, broadcast information including a public land mobile network identifier (PLMN-ID) and an additional identifier, wherein the PLMN-ID and the additional identifier are reserved for a non-mobile network operator (NMO) network that is run by a provider associated with the access network, the NMO network having its own set of subscribers and its own authentication system separate from that of a mobile network operator (MNO);
determining that the access network belongs to a class of access networks that utilizes the additional identifier;
identifying the access network using a combination of the PLMN-ID and the additional identifier based on the class of access networks and a determined scheme; and
determining a network type of the access network based on the combination of the PLMN-ID and the additional identifier, wherein the additional identifier comprises a plurality of sub-identifiers, and wherein a bit length of at least one of the plurality of sub-identifiers is differently allocated for each of a residential network type, an enterprise network type, and an internet service provider (ISP) type, and the network type of the access network comprises one of the residential network type, the enterprise network type, or the ISP type.

2. The method of claim 1, wherein the additional identifier is received in the broadcast information via one or more existing fields.

3. The method of claim 2, wherein the one or more existing fields comprises a Global Cell identification (GCID), a PLMN-ID list, or a closed subscriber group identifier (CSG ID).

4. The method of claim 1, wherein the plurality of sub-identifiers includes a Network Type, a Network identification (Network ID), and a Cell identification (Cell ID).

5. The method of claim 1, wherein the additional identifier is received in the broadcast information via a new field defined for conveying information of the additional identifier.

6. The method of claim 1, further comprising authenticating the access network based on security information comprising at least one of a digital signature, digital certificate, or public key associated with the access network.

7. The method of claim 6, wherein the security information is received in the broadcast information.

8. The method of claim 6, wherein the security information is received after establishing a connection with the access network.

9. The method of claim 1, wherein the determined scheme comprises a scheme for the additional identifier that is preconfigured at a mobile entity, the scheme for the additional identifier defining the bit length of each sub-identifier of the plurality of sub-identifiers for each type of the access network.

10. The method of claim 1, comprising receiving the determined scheme from a network entity, the determined scheme comprising a scheme for the additional identifier, wherein the scheme for the additional identifier defines the bit length of each sub-identifier of the plurality of sub-identifiers for each type of the access network.

11. The method of claim 1, further comprising selecting device credentials based on the access network identity.

12. The method of claim 1, wherein the access network includes at least one Long-term evolution (LTE) small cell configured to provide data-only services.

13. The method of claim 12, wherein the LTE small cell configured to provide data-only services comprises an LTE small cell configured to use unlicensed spectrum.

14. A non-transitory computer-readable medium storing executable instructions which cause a data processing device to:
receive, from an access network, broadcast information including a public land mobile network-identifier (PLMN-ID) and an additional identifier, wherein the PLMN-ID and the additional identifier are reserved for a non-mobile network operator (NMO) network that is run by a provider associated with the access network, the NMO network having its own set of subscribers and its own authentication system separate from that of a mobile network operator (MNO);
determine that the access network belongs to a class of access networks that utilizes the additional identifier;
identify the access network using a combination of the PLMN-ID and the additional identifier based on the class of access networks and a determined scheme; and
determine a network type of the access network based on the combination of the PLMN-ID and the additional identifier, wherein the additional identifier comprises a plurality of sub-identifiers, and wherein a bit length of at least one of the plurality of sub-identifiers is differently allocated for each of a residential network type, an enterprise network type, and an internet service provider (ISP) type, and the network type of the access network comprises one of the residential network type, the enterprise network type, or the ISP type.

15. The non-transitory computer-readable medium of claim 14, wherein the additional identifier is received in the broadcast information via one or more existing fields.

16. The non-transitory computer-readable medium of claim 14, wherein the computer-readable medium further causes the data processing device to authenticate the access network based on security information comprising at least one of a digital signature, digital certificate, or public key associated with the access network.

17. The non-transitory computer-readable medium of claim 14, wherein the plurality of sub-identifiers includes a Network Type, a Network identification (Network ID), and a Cell identification (Cell ID).

18. A method for wireless communication by an access point, the method comprising:
identifying a public land mobile network-identifier (PLMN-ID) and an additional identifier, wherein the PLMN-ID and additional identifier are reserved for a non-mobile network operator (NMO) network that is run by a respective provider, the NMO network having its own set of subscribers and its own authentication system separate from that of a mobile network operator (MNO) based on a class of access networks the access point belongs to, and the additional identifier comprises a plurality of sub-identifiers, wherein a bit length of at least one of the plurality of sub-identifiers included in the additional identifier is differently allocated for each of a residential network type, an enterprise network type, and an internet service provider (ISP) type, and a network type of the class of access networks to which the access point belongs comprises one of the residential network type, the enterprise network type, or the ISP type; and
broadcasting the PLMN-ID and the additional identifier.

19. The method of claim 18, wherein broadcasting comprises broadcasting the additional identifier via one or more existing fields.

20. The method of claim 19, the one or more existing fields comprises a Global Cell-ID (GCID), a PLMN-ID list, or a closed subscriber group identifier (CSG ID).

21. The method of claim 18, wherein the additional identifier is broadcast in a new field defined for conveying information of the additional identifier.

22. The method of claim 18, further comprising broadcasting security information for authenticating the access point comprising at least one of a digital signature, digital certificate, or public key associated with the access network.

23. The method of claim 18, wherein the plurality of sub-identifiers comprises a Network Type, a Network identification (Network ID), and a Cell identification (Cell ID).

24. The method of claim 18, wherein the access point is a long-term evolution (LTE) small cell configured to provide data-only services.

25. The method of claim 24, wherein the LTE small cell is a femtocell or a picocell.

26. An apparatus for wireless communication in an access network, the apparatus comprising:
at least one transceiver configured for broadcasting a public land mobile network-identifier (PLMN-ID) and an additional identifier, wherein the PLMN-ID and additional identifier are reserved for a non-mobile network operator (NMO) network that is run by a respective provider, the NMO network having its own set of subscribers and its own authentication system separate from that of a mobile network operator (MNO) based on a scheme for access network identification, wherein the additional identifier is configured for identifying the access network based on a classification of the access network and the scheme, wherein the additional identifier comprises a plurality of sub-identifiers having at least one sub-identifier of a bit length that is differently allocated for each of a residential network type, an enterprise network type, and an internet service provider (ISP) type, and a network type of the access network comprises one of the residential network type, the enterprise network type, or the ISP type;

at least one processor for processing data; and a memory coupled to the at least one processor for storing data.

27. The apparatus of claim 26, wherein the additional identifier is broadcast in a new field defined for conveying information of the additional identifier.

28. The apparatus of claim 26, wherein at least one transceiver is further configured to broadcast security information for authenticating the access network comprising at least one of a digital signature, digital certificate, or public key associated with the access network.

29. The apparatus of claim 26, wherein the at least one transceiver is further configured for broadcasting a signature for authenticating an access point, wherein the signature authenticates the access point based, at least in part, on an allocated partition associated with the classification of the access point.

* * * * *